No. 694,927. Patented Mar. 4, 1902.
D. H. HOUSTON.
DAYLIGHT LOADING PHOTOGRAPHIC ROLL HOLDER.
(Application filed Apr. 19, 1901.)
(No Model.)
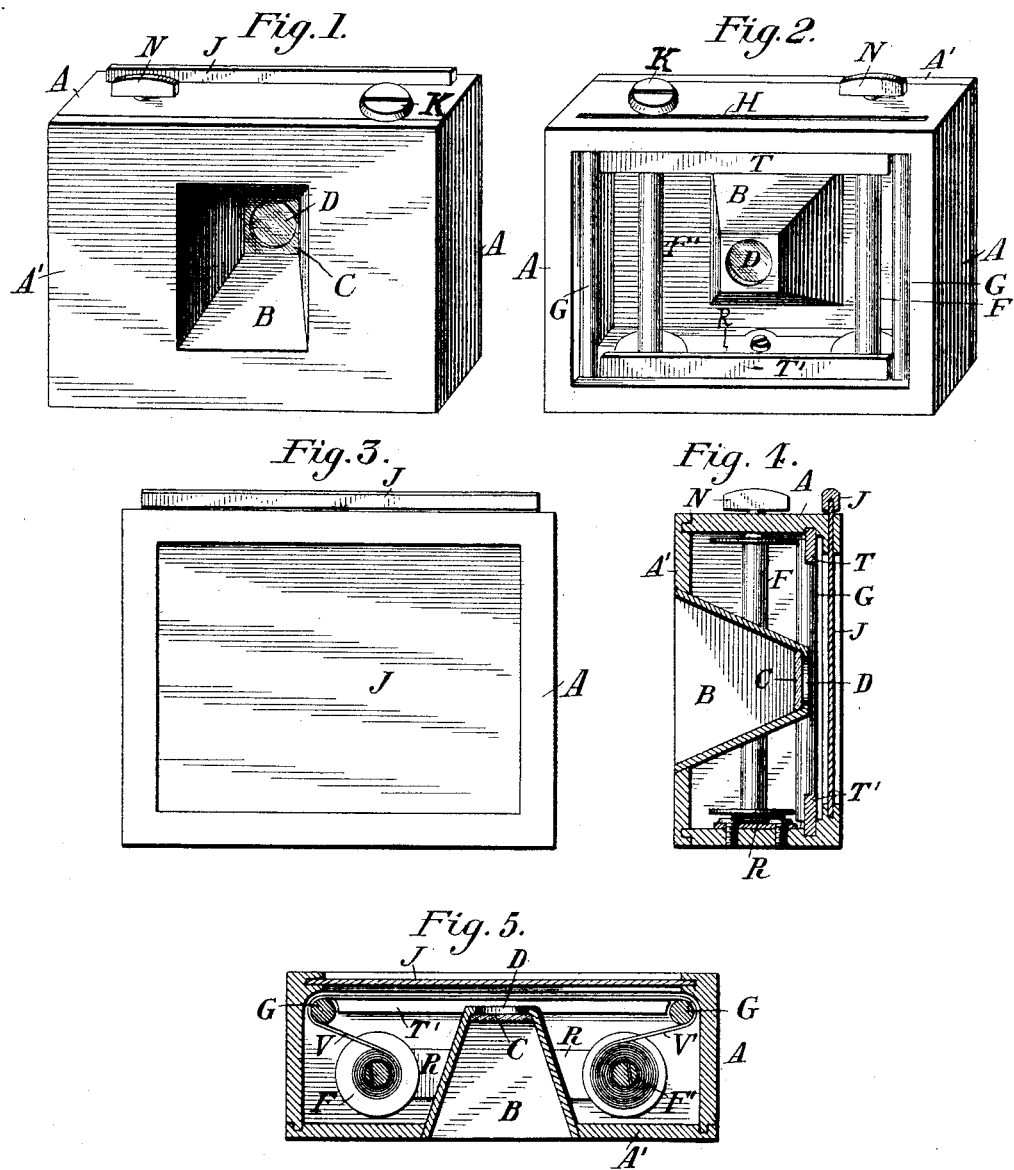
Witnesses
Inventor
David Henderson Houston

UNITED STATES PATENT OFFICE.

DAVID HENDERSON HOUSTON, OF HUNTER, NORTH DAKOTA.

DAYLIGHT-LOADING PHOTOGRAPHIC-ROLL HOLDER.

SPECIFICATION forming part of Letters Patent No. 694,927, dated March 4, 1902.

Application filed April 19, 1901. Serial No. 56,613. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Daylight-Loading Photographic-Roll Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved roll-holder for use in photographic cameras, in which roll-holder can be used cartridges of sensitized film having a light-tight wrapper.

One object of my invention is to provide an improved roll-holder which is made to separate from the camera and permit the use of plate-holders in the same camera, so that the roll-holder and plate-holders can be used interchangeably in the same camera.

Another object of my invention is to produce a simply-constructed roll-holder of great utility, having its casing constructed with single walls on all sides and having only one compartment for holding the rolls of sensitized film and exposing the film to rays of light passed through lenses, and combined therewith an incasement projecting inwardly from the rear side of the casing, through which incasement observation can be had through a sight-aperture positioned in the inner end of the projected incasement, which sight-aperture may have a colored transparent covering, through which indicia on the wrapper of the sensitized film may be observed and indicate the position of the sensitized film in the roll-holder.

In my roll-holder, as shown in the drawings, a so-called "film-support" board having a sight-aperture therethrough is unnecessary and is dispensed with.

My roll-holder may be constructed with its rear side made separable from the casing and the inwardly-projecting incasement removable therewith.

In my roll-holder access to the interior of the casing can be had either through the front slide and the space between the film-edge guides, or, if preferred, access can be had through the rear of the casing after removal of the rear side of the casing.

My roll-holder is very practical, simple to construct, easy to operate, not complicated, and in all respects a perfect working roll-holder of great utility and compact construction of great durability.

My invention consists of a photographic-roll holder suitable for using cartridge-rolls of sensitized film, the novel features of which roll-holder are pointed out in the claims of this specification.

In the drawings which form part of this specification similar characters of reference denote similar parts.

Figure 1 is a perspective view of my roll-holder, taken from the rear side. Fig. 2 is a perspective view of the roll-holder, taken from the front side, showing the interior of the roll-holder. Fig. 3 is a front view of the roll-holder with the front slide in place. Fig. 4 is a central perpendicular cross-sectional view taken through the center of the projected incased sight-passage and sight-aperture of the roll-holder. Fig. 5 is a central plan view of the roll-holder, taken through the center of the projected incased sight-passage and sight-aperture.

A designates the casing of the roll-holder; B, the projected incasement of the sight-passage; C, the transparent covering of the sight-aperture; D, the sight-aperture; F, the reel-spool; F', the supply-spool; G, the guide-rollers; H, the slot for the front slide; J, the front slide; K, the head of the upper pivot for the supply-spool; N, the winding-key, connected to the upper pivot for the reel-spool; R, the spring-support for holding the pivots for pivoting the spool and reel; T, the upper film-edge guide; T', the lower film-edge guide; V, the wrapper of the sensitized film; V', the sensitized film.

To operate the roll-holder, withdraw the front slide and insert the reel-spool through the front opening and place the bottom of the reel-spool on the pivot of the reel-pivoting device, and by pressing on the reel-spool and bringing the top end of the reel-spool under the reel-winding device the reel-spool will spring into connection with the winding device and the reel-spool be in place. Next insert a cartridge-spool of sensitized film in the same manner. Then pass the end of the wrapper of the sensitized film around the guide-rollers and pass the said end of the wrapper along the front of the roll-holder and outside of the film-edge guides. Then pass the end of the wrapper rearward around the guide-roller and attach the end of the wrapper of the film to the reel in the usual manner. Then turn the reel forward enough to take up the slack of the film. Insert the edge of the wrapper of the film into the film-edge guides. Then tighten the wrapper by turning the reel again. Next replace the front slide of the roll-holder casing and then turn the reel forward until the first number, letter, or indicia on the wrapper of the film comes opposite to the sight-aperture in the end of the incasement of the sight-passage of the roll-holder casing, and thus prepared the roll-holder is ready to be inserted into a camera and used in the usual manner.

I claim—

1. In a photographic-roll holder the combination of a casing having a front opening, a slide in the said front opening, the casing having only one interior compartment for holding the rolls of sensitized film and exposing the sensitized film to rays of light passed through a lens, rounded guides for the film positioned at opposite interior front corners of the one-compartment casing, film-edge guides positioned at opposite interior sides of the casing and in line between the said rounded guides, spool and reel pivoting devices in the interior of the one-compartment casing, a reel-winding device, the rear side of the casing having an inward-projecting incased sight-passage leading from the interior rear side of the casing to a sight-aperture in the inner end of the said incased sight-passage, said sight-passage adapted to admit of the observation of indicia upon the wrapper of a sensitized film.

2. In a photographic-roll holder the combination of a casing having a front opening, a slide in the said front opening, the casing having only one interior compartment for holding the rolls of sensitized film and exposing the sensitized film to rays of light passed through a lens, rounded guides for the film positioned at opposite interior front corners of the one-compartment casing, film-edge guides positioned at opposite interior sides of the casing and in line between the said rounded guides, spool and reel pivoting devices in the interior of the one-compartment casing, a reel-winding device, the rear side of the casing arranged to separate from the casing, the rear side of the casing having an inward-projecting incased sight-passage leading from the interior rear side of the casing to a sight-aperture in the inner end of the said incased sight-passage, said sight-passage adapted to admit of the observation of indicia upon the wrapper of a sensitized film.

3. In a photographic-roll holder the combination of a casing having a front opening, a slide in said front opening, the casing having only one interior compartment for holding the rolls of sensitized film and exposing the sensitized film to rays of light passed through a lens, rounded guides for the film positioned at opposite interior front corners of the one-compartment casing, film-edge guides positioned in the rear of the edges of the film and at opposite interior sides of the casing and in line between the said rounded guides, said casing constructed with two of its sides carrying spool and reel pivoting devices, a reel-winding device, the rear side of the casing having an inward-projecting incased sight-passage leading from the interior rear side of the casing to a sight-aperture in the inner end of the said incased sight-passage, said sight-passage adapted to admit of the observation of indicia upon the wrapper of a sensitized film.

In testimony whereof I affix my signature in presence of two witnesses.

DAVID HENDERSON HOUSTON.

Witnesses:
J. H. GALE,
C. F. TURNER.